United States Patent [19]

Hasegawa et al.

[11] Patent Number: 5,716,737
[45] Date of Patent: Feb. 10, 1998

[54] NONAQUEOUS ELECTROLYTE SECONDARY BATTERY, CATHODE ACTIVE MATERIAL AND METHOD FOR PRODUCING THE SAME

[75] Inventors: Masaki Hasegawa, Hirakata; Yasuhiko Bito, Osaka Pref; Shuji Ito, Akashi; Toshihide Murata, Izumiotsu; Yoshinori Toyoguchi, Yao, all of Japan

[73] Assignee: Matsushita Electric Industrial Co., Osaka-fu, Japan

[21] Appl. No.: 616,027

[22] Filed: Mar. 14, 1996

[30] Foreign Application Priority Data

Mar. 20, 1995 [JP] Japan .................. 7-061046

[51] Int. Cl.$^6$ ............................................ H01M 4/50
[52] U.S. Cl. ........................................ 429/224; 423/599
[58] Field of Search .......................... 429/194, 218, 429/224; 423/599

[56] References Cited

U.S. PATENT DOCUMENTS 5,039,582  8/1991  Pistoia ........................ 429/218
5,316,977  5/1994  Thackeray et al. ................ 429/197
5,370,710  12/1994  Nagaura et al. ................. 29/623.1

FOREIGN PATENT DOCUMENTS

| EP 0 279 235 A1 | 8/1988 | European Pat. Off. . |
| EP 0 373 819 A2 | 6/1990 | European Pat. Off. . |
| 1-109662 | 4/1989 | Japan . |
| 2-270268 | 11/1990 | Japan . |
| 5-36409 | 2/1993 | Japan . |
| WO 95/05684 | 2/1995 | WIPO . |

*Primary Examiner*—Stephen Kalafut
*Attorney, Agent, or Firm*—Panitch Schwarze Jacobs and Nabel, P.C

[57] ABSTRACT

A cathode active material for a nonaqueous electrolyte secondary battery is provided. The cathode active material is a composite oxide with a spinel-type structure represented by the general formula $Li_{2-x}[Mn_{2-y}Li_y]O_4$, wherein $-0.1 \leq x < 1.0$ and $0.3 \leq y \leq 0.35$ and wherein the $[Mn_{2-y}Li_y]$ in the general formula is positioned at an octahedral site coordinated by cubic close-packed oxygen ions.

7 Claims, No Drawings

NONAQUEOUS ELECTROLYTE SECONDARY BATTERY, CATHODE ACTIVE MATERIAL AND METHOD FOR PRODUCING THE SAME

BACKGROUND OF THE INVENTION

1. Field of the Invention

The present invention relates to batteries, in particular nonaqueous electrolyte lithium secondary batteries, a cathode active material, and a method for producing the same.

2. Description of the Prior Art

Nonaqueous electrolyte secondary batteries using lithium or lithium compounds as an anode are expected to have a high energy density at high voltages and much research has been performed on them.

Transition metal oxides and chalcogenides such as $LiCoO_2$, $LiMn_2O_4$, $LiFeO_2$, $LiNiO_2$, $V_2O_5$, $Cr_2O_5$, $MnO_2$, $TiS_2$ and $MoS_2$ have been suggested as cathode active materials for nonaqueous electrolyte secondary batteries. These compounds have a layered or tunneled structure which allows the lithium ions to enter and exit. In particular, $LiMn_2O_4$, $LiCoO_2$ and $LiNiO_2$ have attracted much interest as cathode active materials for 4V-class nonaqueous electrolyte lithium secondary batteries.

Of these compounds, $LiCoO_2$ with an ordered layered structure is most promising for applications because of the availability of high voltage and capacity. However, cobalt is a costly element, and there is some anxiety about the supply of this material in view of changing world circumstances. $LiNiO7_2$, which has the same crystal structure as $LiCoO_2$, has a comparatively lower cost and yields high capacities, even exceeding $LiCoO_2$. However, although much research and development has been made toward its application, there is a problem of difficulty in stabilizing the crystal structure.

In this regard, $LiMn_2O_4$ is a desirable material as manganese has an extremely low cost compared to both cobalt and nickel. Further, its crystal structure differs from that of $LiCoO_2$ and $LiNiO_2$ in that it has a spinel structure with a tunneled structure forming a three-dimensional mesh, which is stable and easy to synthesize.

$LiMn_2O_4$ is exceptionally good from a cost viewpoint. However, its capacity is small and problems exist in its charge-discharge cycle performance due to expansion and contraction of the crystal lattice during the charge-discharge cycle. In order to improve the cycle performance, the addition of a third transition metal element has been suggested. However, adding a third element reduces the cost effectiveness of manganese and further reduces the capacity.

SUMMARY OF THE INVENTION

The present invention provides a nonaqueous electrolyte secondary battery comprising:

an anode of lithium or which can reversibly absorb and desorb lithium, a nonaqueous electrolyte, and a cathode having as an active material a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in the general formula is positioned at an octahedral site coordinated by cubic close-packed oxygen ions.

The present invention provides a method for producing a cathode active material for a battery comprising the steps of:

preparing a mixture of γ-MnOOH and a lithium compound and firing the mixture at a temperature of 450° C. to 950° C. to produce a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in the general formula is positioned at an octahedral site coordinated by cubic close-packed oxygen ions.

In a preferred mode of the present invention, the oxygen content of the firing atmosphere is less than 30% by volume.

Further, it is preferable that the water content of the firing atmosphere is than 15 $g/m^3$ and more preferably less than 5 $g/m^3$.

The present invention also provides a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in the general formula is positioned at an octahedral site coordinated by cubic close-packed oxygen ions.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF PREFERRED EMBODIMENTS

The manganese oxide $LiMn_2O_4$ has a spinel-type crystal structure with the manganese ion positioned in an octahedral site formed by close-packed oxygen ions and the lithium ion positioned at a tetrahedral site. This composite oxide is not only simple to synthesize at extremely low cost, but also has exceptional electrode performance such as voltage characteristics. Research has also been performed on $LiMnO_2$ which has a similar composition to $LiCoO_2$ and $LiNiO_2$. Unlike composite oxides which contain cobalt or nickel instead of manganese, good characteristics cannot be expected from $LiMnO_2$.

From the results of prior researches, it is considered that manganese oxides, which have a spinel-type or analogous structure which forms a three-dimensional mesh framework whereby the metal ion is positioned at an octahedral site coordinated by close-packed oxygen ions, will have excellent characteristics as cathode active materials for lithium secondary batteries.

However, when previously known spinel-type $LiMn_2O_4$ is used as a 4V-class cathode active material, its capacity is small compared to $LiCoO_2$ and $LiNiO_2$. Further, problems also exist due to degeneration caused by expansion and contraction of the crystal which accompanies the charge-discharge cycle.

However, the composite oxide of lithium and manganese represented by the formula $Li_2[Mn_{5/3}Li_{1/3}]O_4$ has a crystal structure where ⅙ of the manganese ions at the octahedral sites of the spinel-type structure are replaced by lithium ions, and has a framework of a spinel-type structure where manganese ions and lithium ions are positioned at octahedral sites as $[Mn_{5/3}Li_{1/3}]$. For compounds with the usual spinel structure, the formula is $Li[Mn_{5/3}Li_{1/3}]O_4$. Further, lithium ions not shown in $[Mn_{5/3}Li_{1/3}]$, that is, lithium ions appearing primarily in the aforementioned formula as $Li_2$, are positioned at tetrahedral sites. However, in $Li_2[Mn_{5/3}Li_{1/3}]O_4$ of the present invention, the lithium ions not shown in $[Mn_{5/3}Li_{1/3}]$ are more numerous than for a compound of the usual spinel structure and the sites into which these lithium ions are positioned are different.

Due to the differences in the above crystal structure, $Li_2[Mn_{5/3}Li_{1/3}]O_4$ of the present invention has the voltage characteristics of a 4V-class cathode active material, and the change in the crystal structure due to expansion and contraction of the crystal lattice, which accompany the charge-discharge reaction, is extremely small. As a result, the material has excellent cycle performance with little degeneration associated with the charge-discharge cycle. As such, it is not necessary to add elements to improve the cycle performance and a high capacity with a theoretical value of 163 mAh/g can be obtained at low cost. Further, when batteries are manufactured using this material as a cathode active material, a 4V-class voltage (an average discharge voltage of 3.6 V with respect to lithium metal) can be obtained from the start of the charging reaction (lithium ion deintercalation). Therefore, it is possible to easily manufacture rocking chair-type secondary batteries using as anode active materials not just lithium, but also carbon materials or aluminum alloys where the reaction at the time of charging is a lithium ion intercalation reaction.

The basic stoichiometric composition of the lithium and manganese composite oxide of the present invention is represented by the formula $Li_{2-x}[Mn_{2-y}Li_y]O_4$, where $x=0$ and $y=\frac{1}{3}$. Here, reversible charge-discharge is possible in the range of $-0.1 \leq x < 1.0$ for x value. Further, the value of y changes in the range of $0.3 \leq y \leq 0.35$ depending on the synthesis conditions. In any case, compounds represented by the aforementioned formula can be used as cathode active materials for lithium secondary batteries.

The compound represented by $Li[Mn_{5/3}Li_{1/3}]O_4$ is a similar compound. For this compound, lithium ion deintercalation is difficult and it is necessary to begin the charge-discharge cycle of the battery from the discharge reaction which is an intercalation reaction. As such, desirable characteristics can not be expected for a cathode active material for 4V lithium secondary batteries. Further, when a rocking chair-type battery is constructed, it is necessary to introduce beforehand lithium which can participate in the charge-discharge reaction within the battery system, and the manufacturing process of such battery is complicated.

Although many other lithium and manganese composite oxides exist which have similar compositions, compounds which do not have a crystal structure with the spinel-type structure framework as stated above, are lacking the exceptional characteristics to satisfy all the conditions including voltage, capacity, potential behavior flatness and cycle performance to serve as a cathode active material.

$Li_2[Mn_{5/3}Li_{1/3}]O_4$, which has the spinel-type crystal structure noted above, can be manufactured by firing lithium compounds such as LiOH, $LiNO_3$, $Li_2CO_3$ and $Li_2O$, and γ-MnOOH as starting materials within the temperature range of from 450° C. to 950° C. Here, it is desirable that the firing atmosphere has an oxygen content of less than 30 vol % and a water (water vapor) content of less than 15 g/m³. If the oxygen content of the atmosphere is large, $Li_2MnO_3$ formation is promoted. Further, if the water content of the atmosphere is too large, lithium reacts with water and ion exchange reaction between lithium ions and protons occur, making it difficult to obtain compounds having the desired characteristics.

Thus, the present invention provides cathode active materials for nonaqueous electrolyte lithium secondary batteries having a high energy density at low cost with excellent cycle performance.

The present invention will be explained in detail below by referring to examples. The present invention is not limited only to these examples.

EXAMPLE 1

First, a cathode active material was synthesized as follows:

LiOH and γ-MnOOH as the starting materials were mixed in the desired composition ratios. In order to prevent variations in the lithium content at high temperatures during firing, the mixing ratio of the lithium starting material exceeded the intended stoichiometric composition. The mixture of adjusted starting materials was then fired in an atmosphere where the oxygen content could be adjusted by mixing air ($O_2$ content 21 vol %), nitrogen gas and oxygen gas. Actual oxygen content and firing temperatures are shown in Table 1. The water content for any oxygen content was 5 g/m³. Further, Table 2 shows conditions for firing at 800° C. in air adjusted to a particular water content.

Next, the cathode was produced. First, the active material was mixed with acetylene black, a conductive agent, and a binder, polytetrafluoroethylene resin, at a weight ratio of 7:2:1, and then sufficiently dried. 0.15 g of the obtained cathode mixture was formed into a cathode by compression molding of a disk pellet of 17.5 mm in diameter under a pressure of 2 ton/cm².

A coin-type battery was produced using the cathode produced by the above method. The separator was a porous polypropylene film, the anode was a lithium disk of 0.8 mm thickness and 17.5 mm in diameter and the nonaqueous electrolyte was 1 mole/1 lithium perchlorate dissolved in propylene carbonate.

As a comparative example, a battery using $LiMn_2O_4$ was produced in the same manner.

Charge-discharge tests were performed on the batteries produced in the above manner.

The charge-discharge conditions were a regulated voltage in the range of 3.0 V–4.5 V at a constant current of 0.5 mA. Tables 1 and 2 show the initial discharge capacity and capacity maintenance rate after 20 cycles for each battery.

TABLE 1

| oxygen content | | firing temperature (°C.) | | | | | |
|---|---|---|---|---|---|---|---|
| vol % | | 400 | 450 | 600 | 800 | 950 | 1000 |
| 40 | Initial capacity (mAh) | 2.7 | 2.8 | 3.2 | 5.1 | 5.1 | 5.0 |
| | Capacity maintenance rate after 20 cycles | 75% | 76% | 80% | 82% | 82% | 81% |
| 30 | Initial capacity (mAh) | 12.0 | 15.2 | 15.6 | 15.9 | 15.3 | 14.1 |
| | Capacity maintenance rate after 20 cycles | 89% | 97% | 99% | 99% | 98% | 95% |
| Air (21) | Initial capacity (mAh) | 12.1 | 15.3 | 15.8 | 15.9 | 15.4 | 14.2 |
| | Capacity maintenance rate after 20 cycles | 89% | 97% | 99% | 99% | 98% | 95% |

TABLE 1-continued

| oxygen content | | firing temperature (°C.) | | | | | |
|---|---|---|---|---|---|---|---|
| vol % | | 400 | 450 | 600 | 800 | 950 | 1000 |
| 10 | Initial capacity (mAh) | 12.0 | 15.2 | 15.6 | 15.9 | 15.3 | 14.1 |
|  | Capacity maintenance rate after 20 cycles | 89% | 97% | 99% | 99% | 98% | 95% |
| Comparative Example | Initial capacity (mAh) | 10.0 | 10.1 | 11.2 | 11.7 | 11.8 | 11.7 |
|  | Capacity maintenance rate after 20 cycles | 73% | 75% | 80% | 81% | 82% | 82% |

TABLE 2

| Water content | Initial capacity (mAh) | Capacity maintenance rate after 20 cycles |
|---|---|---|
| 30 g/m$^3$ | 12.1 | 78% |
| 20 g/m$^3$ | 14.2 | 85% |
| 15 g/m$^3$ | 15.0 | 98% |
| 10 g/m$^3$ | 15.6 | 99% |
| 5 g/m$^3$ | 15.9 | 99% |
| 2 g/m$^3$ | 15.9 | 99% |

As shown in Table 1, by using $Li_2[Mn_{5/3}Li_{1/3}]O_4$ synthesized by the methods of the present invention as a cathode active material, lithium secondary batteries with high capacities and exceptional cycle performance can be obtained. Further, x-ray diffraction measurements show composite oxide samples of good quality with the spinel-type crystal structure of cubic system or distorted tetragonal system.

EXAMPLE 2

In the present example, batteries were produced using γ-MnOOH, $MnO_2$ or $Mn_3O_4$ as starting materials by firing them in air. Mixing ratios with the lithium starting materials are the same as in Example 1 and the firing temperature was 700° C.

Using the obtained material, batteries were produced by the methods as in Example 1.

Charge-discharge tests were performed on the batteries produced in the above manner.

The charge-discharge conditions were a regulated voltage in the range of 3.0 V–4.5 V at a constant current of 0.5 mA. Table 3 shows the initial discharge capacity and capacity maintenance rate after 20 cycles for each battery.

As shown in Table 3, when manganese is used as the starting materials other than γ-MnOOH such as $MnO_2$ or $Mn_3O_4$, desirable characteristics are not obtained.

TABLE 3

| Starting material | Initial capacity (mAh) | Capacity maintenance rate after 20 cycles |
|---|---|---|
| γ-MnOOH | 15.8 | 99% |

TABLE 3-continued

| Starting material | Initial capacity (mAh) | Capacity maintenance rate after 20 cycles |
|---|---|---|
| $MnO_2$ | 14.1 | 78% |
| $Mn_3O_4$ | 14.2 | 80% |

In the above example, lithium hydroxide was used as the lithium starting material to produce the cathode active material but other lithium compounds such as lithium nitrate, lithium carbonate and lithium oxide produce similar results.

Further, in each of the above examples, when producing the batteries, metallic lithium was used as the anode active material, but materials which can reversibly absorb and desorb lithium such as aluminum, metals alloyed with lithium such as aluminum alloy, carbon materials and graphite compounds produce similar results.

The nonaqueous electrolyte is not limited only to lithium perchlorate as the electrolyte salt and propylene carbonate as the solvent. For example, similar results may be obtained by using electrolyte salts such as lithium tetrafluroborate, lithium hexaflurophosphate, lithium trifluoromethanesulfonate and other electrolyte salts, as well as by using solvents such as ethylene carbonate, diethyl carbonate, propylene carbonate, dimethoxy ethane, γ-butyrolactone, dioxolane, tetrahydrofuran, methyltetrahydrofuran and dimethylsulfoxide or other non-protonic solvents used in lithium secondary batteries. Further, the shape of the battery is not limited to coin-types, and similar results are obtained for cylindrical and rectangular shapes.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A nonaqueous electrolyte secondary battery comprising:
   an anode of lithium or which can reversibly absorb and desorb lithium,
   a nonaqueous electrolyte, and
   a cathode having as an active material a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in said general formula is positioned at an octahedral site coordinated by cubic close-packed oxygen ions.

2. A cathode active material for a battery comprising a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in said general formula is positioned at an octahedral site coordinated by cubic close-packed oxygen ions.

3. A method of producing a cathode active material for a battery comprising the steps of:
   preparing a mixture of γ-MnOOH and a lithium compound and
   firing said mixture at a temperature of 450° C. to 950° C. to produce a composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in said general formula is positioned at an octahedral site coordinated by cubic close-packed oxygen ions.

4. The method of producing a cathode active material for a battery in accordance with claim 3, wherein said "firing step" is performed in an atmosphere of which oxygen content is less than 30% by volume.

5. The method of producing a cathode active material for a battery in accordance with claim 3, wherein said "firing step" is performed in an atmosphere of which water content is less than 15 $g/m^3$.

6. The method of producing a cathode active material for a battery in accordance with claim 4, wherein water content of said atmosphere is less than 15 $g/m^3$.

7. A composite oxide with a spinel-type structure represented by the general formula $Li_{2-x}[Mn_{2-y}Li_y]O_4$, wherein $-0.1 \leq x < 1.0$ and $0.3 \leq y \leq 0.35$, and wherein the $[Mn_{2-y}Li_y]$ in said general formula is positioned at an octahedral site coordinated by cubic close-packed oxygen ions.

* * * * *